United States Patent [19]
Yabuta et al.

[11] 4,073,542
[45] Feb. 14, 1978

[54] FLUID PRESSURE CONTROL DEVICE AND MOTOR VEHICLE BRAKING SYSTEM INCORPORATING SUCH DEVICE

[75] Inventors: Keiichiro Yabuta; Yoshitaka Koike, both of Yokohama, Japan

[73] Assignee: Nissan Motor Company, Limited, Japan

[21] Appl. No.: 662,228

[22] Filed: Feb. 27, 1976

Related U.S. Application Data

[63] Continuation of Ser. No. 540,001, Jan. 10, 1975, abandoned, which is a continuation of Ser. No. 305,040, Nov. 9, 1972, abandoned.

[30] Foreign Application Priority Data

Nov. 13, 1971   Japan .................. 46-90986

[51] Int. Cl.² ............................. B60T 8/26
[52] U.S. Cl. ...................... 303/6 C; 188/349
[58] Field of Search ............ 303/6 C, 6 R, 84; 188/349, 152

[56] References Cited

U.S. PATENT DOCUMENTS

| | | | |
|---|---|---|---|
| 3,464,741 | 9/1969 | Falk | 303/6 C |
| 3,623,776 | 11/1971 | Wellmann | 303/6 C |
| 3,661,426 | 5/1972 | Tam | 188/349 X |
| 3,663,067 | 5/1972 | Yabuta | 303/84 A X |
| 3,697,138 | 10/1972 | Marting | 188/349 X |
| 3,773,363 | 11/1973 | Papin | 303/6 C |
| 3,838,887 | 10/1974 | Stelzer | 188/349 X |

*Primary Examiner*—Trygve M. Blix
*Assistant Examiner*—Douglas C. Butler

[57] ABSTRACT

A hydraulic braking system of the split type including a fluid pressure control device which is adapted to reduce or stop the rate of increase of an output fluid pressure to wheel cylinders when a certain critical level is reached by an input fluid pressure delivered from a master cylinder, wherein the rates of increase of such critical level and the output fluid pressure if higher than the critical level are lowered when one of the split hydraulic circuits of the braking system fails or, if the rate of increase of the output fluid pressure higher than the critical level, only the critical level of the pressure is lowered.

3 Claims, 3 Drawing Figures

FLUID PRESSURE CONTROL DEVICE AND MOTOR VEHICLE BRAKING SYSTEM INCORPORATING SUCH DEVICE

This is a continuation of application Ser. No. 540,001 filed Jan. 10, 1975 which is a continuation of application Ser. No. 305,040 filed on Nov. 9, 1972, both of which are now abandoned.

The present invention is concerned generally with hydraulic braking systems of motor vehicles and, more particularly, the invention relates to fluid pressure control devices for use in motor vehicle braking systems of the split type.

Failure of one component of a simple hydraulic braking system can make the brakes inoperable and, to reduce the risk of this occurring, it is practiced to use a braking system which is divided into two independent units. One of these units is connected to front wheel cylinders, for example and the other to the rear wheel cylinders so that if one circuit fails the driver is still left with the other circuit intact. Typical examples of the braking system of this character are the system using two master cylinders which are mounted in parallel to each other and the system using a tandem master cylinder using two independent pistons.

In any of the braking systems of the split type, the brakes are applied concurrently on the front and rear wheels. If, thus, an excess amount of braking force is applied to the front wheels, then the driver is no longer able to have directional control over the motor vehicle and sometimes invite a serious danger on the vehicle occupant during the braking operation. If, conversely, the rear wheels are braked excessively forcefully, there will now be a danger of the rear wheels locking and skidding. The prior art braking systems of the described general natures are, for these reasons, not fully acceptable for the assurance of safety of the motor vehicle during the braking operation and for providing satisfactory braking efficiency.

SUMMARY OF THE INVENTION

The present invention contemplates provision of an improved fluid pressure control device which is adapted to be incorporated in the hydraulic braking system of the split type for eliminating the drawbacks of the above described natures.

The fluid pressure control device according to the present invention thus forms part of a hydraulic braking system having a master cylinder unit from which first and second fluid lines lead one of which is connected to at least one wheel cylinder such as rear wheel cylinders. The control device generally includes a housing having formed therein a generally cylindrical cavity and a chamber hermetically sealed to the cavity, the chamber communicating with the second fluid line from the master cylinder, a plunger which is axially movable through the cavity and chamber in the housing and which has an annular projection located in the cavity and a reduced end portion extending into the chamber, an annular sealing member attached to a wall portion defining the cavity with the plunger extending through an aperture in the annular sealing member, the aperture being larger in diameter than the plunger for providing an annular clearance between the plunger and sealing member, the annular projection of the plunger being engageable with the sealing member as the plunger is axially moved with its reduced end portion protruding into the chamber in the housing, the cavity in the housing communicating with the first fluid line from the master cylinder at its portion opposite to the projection of the plunger across the sealing member and with at least one wheel cylinder at its portion posterior to the annular projection of the plunger and the sealing member, and biasing means urging the plunger away from the chamber for normally maintaining the annular projection disengaged from the annular sealing member. The control device according to the present invention being thus constructed, the output fluid pressure from the control device is increased at the same rate as the input fluid pressure directed into the cavity in the housing when the input fluid pressure is lower than a predetermined critical level. When the predetermined critical level is reached by the input fluid pressure directed into the cavity and chamber in the housing, then the plunger is moved in a manner that the output fluid pressure is maintained at a fixed level which is equal to the predetermined critical level or, otherwise, the output fluid pressure is increased at a rate lower than the rate of increase of the input fluid pressure. In the event a failure takes place in the second fluid line leading to the chamber in the housing so that no fluid pressure is directed into the chamber, then either the predetermined critical level and the rate of increase of the output fluid pressure higher than this critical level are decreased from those for the normal operation or, where the control device is of the type maintaining the output fluid pressure at a constant level after the critical level has been reached, the critical level is decreased from the level which is predetermined to suit the normal operation of the braking system.

The objects, advantages and features of the braking system and also the fluid pressure control device forming part of the braking system in accordance with the present invention will become more apparent from the following description taken in conjunction with the following drawings.

DESCRIPTION OF THE PREFERRED EMBODIMENT

Figure 1:
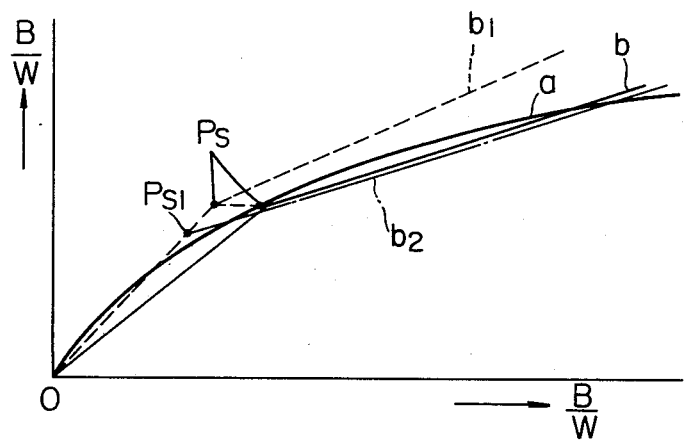
FIG. 1 is a graphic representation of conventional and desired proportions of the front and rear braking forces $B_f$ and $B_r$, respectively, in terms of an overall weight of the motor vehicle.

Referring to FIG. 1, there are shown proportions of the braking forces to be applied to the front and rear wheel of the motor vehicle having a certain amount of overall weight, wherein ratios of the braking forces $B_f$ and $B_r$ on the front and rear wheels, respectively, versus the weight W of the motor vehicle are indicated on the axes of abscissa and ordinate of orthogonal coordinates. In order to enable the front and rear wheels to be braked in an optimum condition, it is most desirable that the proportions between the ratios $B_f/W$ and $B_r/W$ be varied in a relation indicated by curve $a$ in FIG. 1. Thus, the fluid pressures supplied to the front and rear cylinders should be regulated in a manner to develop the braking forces following this curve $a$ for avoiding the skidding of the rear wheels and providing a satisfactory braking efficiency during the braking operation of the motor vehicle. The primary object of the present invention is thus to provide an improved hydraulic braking system in which the anti-skid characteristics are combined with the fail-safe characteristics.

Figure 2:
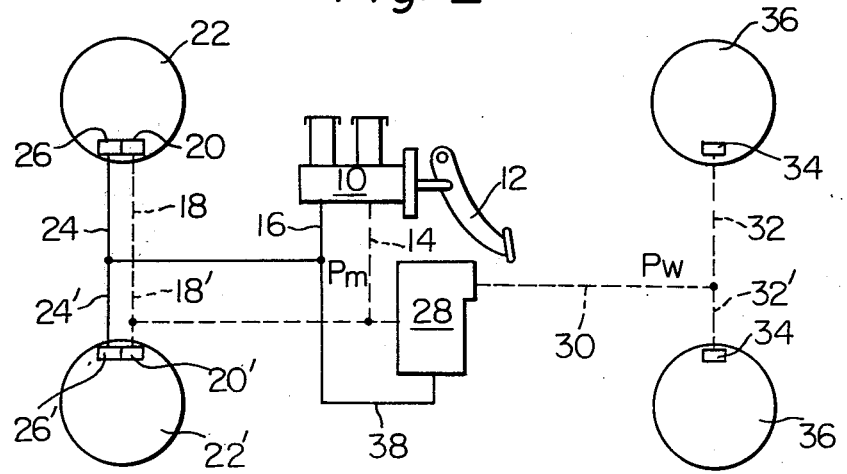
FIG. 2 is a schematic view showing a braking system in which the pressure control device herein disclosed is to be incorporated.

A general construction of the split braking system accomplishing this object is schematically illustrated in FIG. 2. Referring to FIG. 2, the braking system includes a master cylinder unit 10 having separate chambers (not shown) which are actuated from a foot pedal 12. Main and auxiliary fluid circuits 14 and 16 lead respectively from these separate chambers. The main fluid line 14 is connected through branch lines 18 and 18' to front wheel cylinders 20 and 20' which are associated with front brakes 22 and 22', respectively. Likewise, the auxiliary fluid line 16 is connected through branch lines 24 and 24' to wheel cylinders 26 and 26' for the front brakes 22 and 22', respectively. The main fluid line 14 is further led to a fluid pressure control device 28 which is connected through a fluid line 30 and branch lines 32 and 32' to rear wheel cylinders 34 and 34' which are associated with rear brakes 36 and 36', respectively. The fluid pressure denoted by $P_m$ delivered from the master cylinder 10 is directed to the front wheel cylinders 20, 20', 26 and 26' through the main and auxiliary fluid lines 14 and 16, respectively, without being modulated. The fluid pressure control device 28 connected to the main fluid line 14 may be of the known pressure limiting valve type which is adapted to maintain the output fluid pressure at a fixed level after a predetermined critical level has been reached by the supplied fluid pressure $P_m$ or of the known pressure proportioning valve type which is operable to reduce the rate of increase of the output fluid pressure after the predetermined critical level has been reached. The output pressure thus modulated, as denoted by $P_w$, is directed to the wheel cylinders 34 and 34' of the rear brakes 36 and 36' via the fluid line 30. The output fluid pressure $P_w$ develops a braking force which is substantially providing a relation indicated by a curve $b$ approximating the desired curve $a$ in FIG. 1.

In the event the auxiliary hydraulic circuit fails in the braking system of the above described known construction, no hydraulic pressure is directed into the front wheel cylinders 26 and 26' through the fluid line 16 with the result that the braking on the front wheels is reduced as compared with the braking on the rear wheels. The relation between the front and rear braking forces under this condition is indicated by curve $b_1$ in FIG. 1. It is understood from this curve $b_1$ that the performance characteristics of the braking device are such that the rear wheels tend to lock up and create a dangerous condition.

The problem of the above described nature is completely solved by the use of the fluid pressure control device according to the present invention, wherein the fluid pressure $P_m$ in the auxiliary hydraulic circuit is directed into the pressure control device 28 as a reference signal through a fluid line 38 leading from the auxiliary fluid line 16. When, thus, the auxiliary hydraulic circuit fails and accordingly no fluid pressure is directed to the control device 28 through the line 38, then the control device 28 operates in a manner that the previously mentioned critical level and the rate of increase of the output fluid pressure, if higher than the critical level, are reduced so as to provide a relation between the front and rear braking forces as indicated by a curve $b_2$ approximating the desired curve $a$ in FIG. 1.

Figure 3:
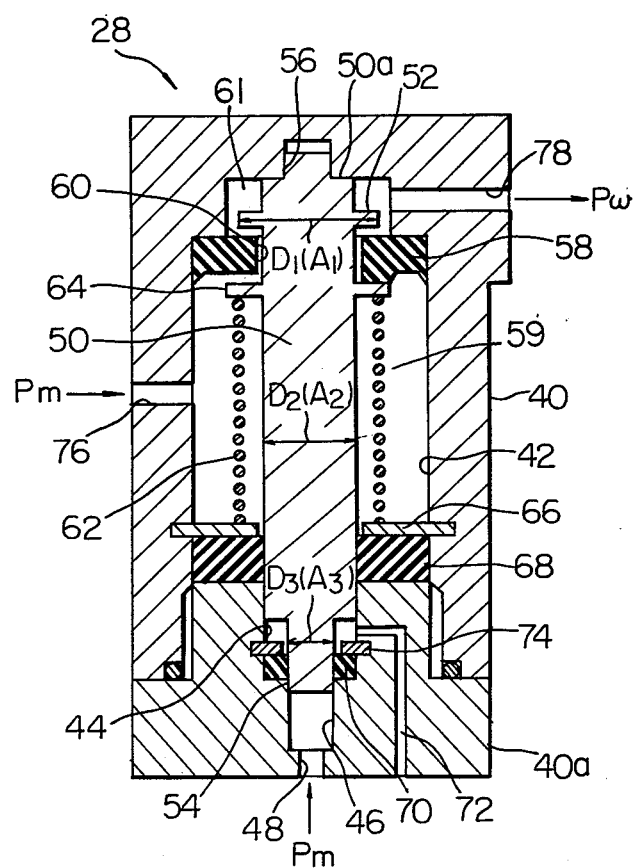
FIG. 3 is a longitudinal sectional view of a preferred embodiment of the pressure control device according to the present invention.

A preferred embodiment of the fluid pressure control device adapted to achieve this purpose is now illustrated in FIG. 3. The control device shown in FIG. 3 is constructed as the proportioning valve type. The recyclable or continuous acting device includes a generally cylindrical housing 40 having a cavity 42 formed therein. The cavity 42 has an open end and an integrally threaded wall portion at the open end. The open end of the cavity is closed by an externally threaded end plug member 40a which is fixedly connected to an end of the housing 40 to form part of the housing 40 and is threadably received in the internally threaded wall portion of the cavity 42 and has stepped axial bores 44 and 46. The bore 46 is smaller in diameter than the bore 44 and joins with a fluid inlet port 48. A plunger 50 having an annular flange or projection 52 and a reduced end portion 54 fixedly connected to the plunger 50 is axially movable throughout the cavity 42 and is slidably fitted at one end in an axial hole 56 close to the annular projection 52 of the plunger and at the other in the bore 44 which is remote from the annular projection 52. Thus, the reduced end portion 54 of the plunger 50 axially projects into the reduced axial bore 46, thereby forming a contractable chamber between the end of the portion 54 and the fluid inlet port 48 and is slidably fitted in the bore 46. The plunger 50 is herein assumed to have an outside diameter of $D_1$ and a cross sectional area of $A_1$ at its annular projection 52, an outside diameter of $D_2$ and a cross sectional area of $A_2$ at its intermediate stem portion, and an outside diameter of $D_3$ and a cross sectional area of $A_3$ at its reduced end portion 54, as indicated in FIG. 3. Thus, the axial bores 44 and 46 are assumed to have the diameters of $D_2$ and $D_3$ and sectional areas of $A_2$ and $A_3$ respectively. An annular sealing member 58 is securely attached to a wall portion of the housing 40 defining the cavity 42, having a central aperture 60 through which the plunger 50 is axially movable. This aperture 60 is appreciably larger in diameter than the stem portion of the plunger 50 which is surrounded by the sealing member 58, thereby providing an annular clearance therebetween, as seen in FIG. 3. The sealing member 58 is located inboardly of the annular projection 52 of the plunger 50 and divides the cavity 42 into a first fluid chamber 59 and a second fluid chamber 61 in which the annular flange 52 is located. The annular flange 52 is engageable with the sealing member 58, when the plunger is axially moved toward the chamber 46, viz., downwardly of the drawing. When the annular projection 52 of the plunger 50 is thus brought into abutting engagement with the sealing member the communication between the cavity portions across the sealing member 58 that is, the first chamber 59 and the second chamber 61, is interrupted. The plunger 50 is, however, urged away the chamber 46 by suitable biasing means so that the annular projection 52 of the plunger is biased to be unseated from the sealing member 58 under normal conditions. This biasing means is herein shown as comprising a preload spring 62 which is located in the first chamber 59 which is seated at one end on an annular projection 64 formed on the plunger 50 close to the sealing member 58 and an annular spring seat 66 which is fast on the housing 40 and spaced apart from the sealing member 58. The cavity 42 is sealed to the axial bore 44 by a seal 68 interposed between the spring seat 66 and the inner end of the plug member 40a. The bore 44, in turn, is sealed to the reduced bore 46 by a seal 70 which is positioned at the bottom of the bore 44. An air discharge passage 72 may preferably be formed in the plug member 40a, opened at one end into an end portion of the axial bore 44 and at the other to the atmosphere. The movement of the plunger 40 toward the chamber 46 may be limited by an annular stop member 74 resting on the seal 70 while the movement of the plunger away from the chamber 46 may be limited by the shoulder portion 50a.

A fluid inlet port 76 is formed in the housing 40 and opens into the first chamber 59 while a fluid outlet port 78 is formed in the housing 40 and open into the second chamber 61. The fluid inlet port 76 leads from the main fluid line 14 and the fluid outlet port 78 leads to the fluid line 30 communicating with the rear wheel cylinders 34 and 34' (see FIG. 2). The other fluid inlet port 48 leads from the fluid line 38 which is branched from the auxiliary fluid line 16. A fluid pressure $P_m$ thus obtains at the fluid inlet ports 48 and 76 while a fluid pressure $P_w$ obtains at the fluid outlet port 78 during the braking operation.

Under the normal conditions when the fluid pressure control device is held inoperative, the plunger 50 is urged away from the chamber 48 by the action of the preload spring 62 so that the annular projection 52 of the plunger is kept unseated from the annular sealing member 58.

When, in operation, the foot brake 12 is depressed by the driver to decelerate the motor vehicle, the fluid pressure $P_m$ is delivered from the master cylinder 10 and directed into the front wheel cylinders 20, 20', 26 and 26' through the fluid lines 14 and 16, thereby braking the front wheels by a force related to the fluid pressure $P_m$. This fluid pressure $P_m$ is also directed to the fluid pressure control device 28 through the lines 14 and 38 and enters the cavity 42 and chamber 46 through the fluid inlet ports 76 and 48, respectively. In this condition, the plunger 50 incipiently stays in the shown position with its annular projection 52 unseated from the adjacent sealing member 58 as above mentioned. The fluid pressure $P_m$ entering the cavity 42 through the inlet port 76 is consequently passed over to the outlet port 78 through the clearance between the plunger 50 and sealing member 58 without being modulated. Thus, $$P_w = P_m.$$

The input fluid pressure $P_m$ then acts on the effective area $A_2$ of the plunger 50 through a hole or groove formed in the shoulder portion 50a of the plunger 50 or a small gap created owing to unconformity between the surfaces of the shoulder portion 50a and the cavity wall and gap between the one end of the plunger 50 and a wall defining the axial hole 56 which is too small to be shown, as customary, to establish a force PmA to depress the plunger toward the chamber 46. Since, in this condition, the fluid pressure $P_m$ also obtains in the chamber 46, this force $P_m \times A_2$ is opposed by a force F of the preload spring 62 and the product of the fluid pressure $P_m$ and the cross sectional area $A_3$ of the reduced end portion 54 of the plunger 50. The plunger 50 is therefore maintained in a balanced position when the following condition is established:

$$P_m \cdot A_2 \leq P_m \cdot A_3 + F \qquad 1.$$

It is, in this instance, important that each of the annular projections 52 and 64 of the plunger have equal working areas so that no differential action is imparted to the plunger 50 by these projections.

When the fluid pressure $P_m$ reaches a predetermined critical level of $P_s$, then the plunger 50 is moved toward the chamber 46 against the force F of the spring and the force $P_m \times A_3$, until the annular projection 52 is brought into abutting engagement with the annular sealing member 58. The fluid communication between the cavity portions across the sealing member 58 is now interrupted so that the fluid $P_m$ is blocked in the cavity 42. The critical level $P_s$ of the fluid pressure $P_m$ causing the plunger 50 to move into this position is given by:

$$P_s = F/(A_2 - A_3) \qquad 2.$$

where $A_2$ is larger than $A_3$.

The movement of the plunger 50 toward the chamber 46 is not resisted by a pressure of air in the bore 54 because the air is discharged through the passage 72 formed in the housing 40.

Once the annular projection 52 of the plunger 50 is thus forced against the sealing member 58, the output fluid pressure $P_w$ urges the plunger 50 toward the chamber 46 by a force $P_w \times A_1$ while, at the same time, the input fluid pressure $P_m$ higher than the level $P_s$ urges the plunger 50 away from the chamber 46 by a force $P_m(A_1 - A_2)$. The condition for equilibrium of the plunger 50 is therefore written:

$$P_w \cdot A_1 = P_m(A_1 - A_2) + P_m \cdot A_3 + F$$

so that $$P_w = P_m \cdot (A_1 - A_2 + A_3)/A_1 + F/A_1 \qquad 3$$

It therefore follows that then the input fluid pressure $P_m$ increases beyond the predetermined critical level of $P_s$ then the output fluid pressure $P_w$ will increase, under the condition given by this Eq. 3, at a rate of $k$ which is defined from Eq. 3 as:

$$k = (A_1 - A_2 + A_3) \qquad 4$$

In the event the auxiliary hydrauluc circuit fails so that no fluid pressure is directed to the chamber 46 through the inlet port 48, there will hold:

$$P_m \cdot A_2 \leq F,$$

with the result that the critical level $P_{s1}$ of the fluid pressure in this condition is expressed as:

$$P_{s1} = F/A_2 \qquad 5$$

The condition for equilibrium of the plunger 50 when the input fluid pressure $P_m$ is higher than the critical level of $P_{s1}$ is written as:

$$P_w \cdot A_1 = P_m(A_1 - A_2) + F$$

hence $$P_w = P_m(A_1 = A_2)/A_1 + F/A_1 \qquad 6$$

Thus, when the input fluid pressure $P_m$ is higher than the varied critical level of $P_{s1}$ and still continues to increase, then the output fluid pressure $P_w$ will rise at a rate of $$k_1 = (A_1 - A_2)/A_1, \qquad 7$$

while satisfying the relation of Eq. 6.

To summarize, when the auxiliary hydraulic circuit fails in the braking system according to the present invention thus described, the critical level $P_s$ of the fluid pressure is lowered to $P_{s1}$ providing a relation indicated by $P_{s1}$ on curve $b_1$ in FIG. 1 between the front and rear braking forces and, at the same time, the rate k of increase of the output fluid pressure $P_w$ is reduced to $k_1$. The curve $b_1$ which is attained by the control devuce according to the present invention can be modified so as to closely approximate the desired curve $a$ if the cross sectional area $A_3$ of the reduced end portion 54 of the plunger (FIG. 3) is properly selected. Thus, the fluid pressure control device according to the present invention and accordingly the braking system incorporating such device are adapted to provide braking forces which are sufficient for normal braking requirements even in the event the auxiliary hydraulic circuit of the braking system fails.

It should be borne in mind that although the control device according to the present invention has herein been described as applied to the device of the pressure proportioning valve type, such is merely for the purpose of illustration. The features of the device herein disclosed are, therefore, well compatible with fluid control device of the pressure limiting valve type. Where the control device of the pressure limiting type is thus used to incorporate the features according to the present invention, the output fluid pressure is prevented from further increasing once predetermined critical level is reached by the input fluid pressure. In this condition, only the critical level of the fluid pressure is reduced so that the braking forces are varied in a satisfactory manner as in the case of the control device of the pressure proportioning valve type.

What is claimed is:

1. A motor vehicle hydraulic braking system comprising a master cylinder of a split type, a main fluid line leading from said master cylinder to rear wheel cylinders, as auxiliary fluid line leading from said master cylinder to front wheel cylinders, and a fluid pressure control device comprising a housing defining a cavity therein, which has an open end, an end plug which is fixedly attached to said housing to close said open end and is formed therein with large and small bores sealed from each other, said small bore communicating with said auxiliary fluid line to deliver fluid pressure into said small bore for threadedly attaching said end plug to said housing, an annular sealing member attached to a wall defining said cavity and dividing said cavity into a first chamber communicating with said main fluid line to deliver input fluid pressure thereinto and a second chamber communicating with said rear wheel cylinders, said first chamber being between said second chamber and said large bore, said large bore being sealed from said first chamber, said sealing member having an aperture formed therethrough, a plunger extending through said aperture and axially movable in said first and second chambers and said large bore and having an annular flange located in said chamber and engageable with said sealing member, said aperture providing an annular clearance between said sealing member and said plunger, and biasing means urging said plunger in a direction to disengage said annular flange from said sealing member, said plunger having a reduced end portion which is slidably fitted in said small bore and on which said fluid pressure in said small bore acts to urge said plunger in said direction, said end plug having further formed therein an air discharge passage opening into said large bore and outside said end plug for accomodating the axial movement of said plunger.

2. A recyclable fluid pressure device for a motor vehicle hydraulic braking system, comprising a housing defining a cavity therein which has an open end and an internally threaded wall portion at said open end, an externally threaded end plug which is threadedly received in said internally threaded wall portion of said cavity to close said open end and is formed therein with a bore, an annular sealing member which is attached to a wall defining said cavity and divides said cavity into a first chamber and a second chamber, said first chamber being between said second chamber and said bore, said bore being sealed from said first chamber, said housing having formed therein a first inlet port opening into said first chamber and into which inlet fluid pressure is delivered, and an outlet port opening from said second chamber outside said housing, said end plug being formed with a second inlet port opening into said bore and into which fluid under pressure is delivered, said annular sealing member having formed therethrough an aperture, a plunger extending through said aperture and axially movable in said first and second chambers and said bore, said aperture providing an annular clearance between said annular sealing member and said plunger, said plunger having an annular flange which is located in said second chamber and is engageable with said annular sealing member, and biasing means urging said plunger in a direction to disengage said annular flange from said annular sealing member, said plunger having a reduced end portion which is slidably fitted in said bore of said end plug and on which said fluid pressure in said second inlet port acts to urge said plunger in said direction, said end plug having further formed therein an air discharge passage communicating a large bore with the outside of said housing for accomodating the axial movement of said plunger.

3. In a motor vehicle hydraulic braking system incorporating a master cylinder of a split type and first and second fluid lines which lead from said master cylinder, a recyclable fluid pressure control device comprising a housing defining a cavity therein which has an open end and an internally threaded wall portion at said open end, an externally threaded end plug which is threadedly received in said internally threaded wall portion of said cavity to close said open end and is formed therein with a bore communicating with said second fluid line to receive fluid pressure threrefrom, an annular sealing member which is attached to a wall defining said cavity and divides said cavity into a first chamber communicating with said first fluid line to receive input fluid pressure therefrom and a second chamber communicating with at least one wheel cylinder, said first chamber being between said second chamber and said bore, said bore being sealed from said first chamber, said sealing member having an aperture formed therethrough, a plunger extending through said aperture and axially movable in said first and second chambers and said bore and having an annular flange which is located in said second chamber and is engageable with said sealing member, said aperture providing an annular clearance between said sealing member and said plunger, and biasing means urging said plunger in a direction to disengage said annular flange from said sealing member, said plunger having a reduced end portion which is slidably fitted in said bore of said end plug and on which said fluid pressure in said bore acts to urge said plunger in said direction, said end plug having further formed therein an air discharge passage communicating a large bore with the outside of said housing for accomodating the axial movement of said plunger.

* * * * *